(12) United States Patent
Greene III et al.

(10) Patent No.: US 6,936,176 B1
(45) Date of Patent: Aug. 30, 2005

(54) TRANSPORTABLE WATER TREATMENT SYSTEM

(75) Inventors: George C. Greene III, Charleston, SC (US); George C. Greene IV, Charleston, SC (US); Sean P. Kerrigan, Glendale, AZ (US)

(73) Assignee: Water Missions International, Charleston, SC (US)

( * ) Notice: Subject to any disclaimer, the term of this patent is extended or adjusted under 35 U.S.C. 154(b) by 0 days.

(21) Appl. No.: 10/891,863

(22) Filed: Jul. 15, 2004

Related U.S. Application Data

(60) Provisional application No. 60/569,887, filed on May 11, 2004.

(51) Int. Cl.[7] .............................................. B01D 37/00
(52) U.S. Cl. ...................... 210/702; 210/738; 210/754; 210/793; 210/807; 210/205; 210/206; 210/241; 210/252; 210/257.1; 210/258; 210/259; 210/269; 210/275; 210/290; 210/416.1
(58) Field of Search ................................ 210/667, 669, 210/702, 738, 754, 792, 793, 807, 198.1, 210/205, 206, 241, 252, 257.1, 258, 259, 210/269, 275, 283, 290, 416.1

(56) References Cited

U.S. PATENT DOCUMENTS

| 4,193,869 A | 3/1980 | Brucker et al. |
| 4,427,551 A | 1/1984 | Duveau |
| 5,942,107 A | 8/1999 | Busch, Jr. |
| 6,464,884 B1 | 10/2002 | Gadgil |
| 6,488,842 B2 | 12/2002 | Nagaoka |

*Primary Examiner*—Robert James Popovics
(74) *Attorney, Agent, or Firm*—Robert H. Hammer III, P.C.

(57) ABSTRACT

A transportable water treatment system comprising: an inlet adapted to receive water having a pressure of between 10 to 60 psig, a primary regenerable filter connected so as to receive water that has flown through the inlet, the primary regenerable filter configured to separate solids from water flowing therethrough, a secondary regenerable filter, the secondary regenerable filter connected downstream from the primary regenerable filter, and a chemical feed unit connected downstream of said secondary regenerable filter, the chemical feed unit configured to treat water flowing through introduction of chemicals to the water, a water discharge pipe adapted to discharge treated water from the chemical feed unit, where said inlet, the primary regenerable filter, the secondary regenerable filter, the chemical feed unit, and the discharge pipe make up a transportable water treatment and the transportable water treatment is adapted to fit within a bed of a sub-compact pickup truck.

20 Claims, 5 Drawing Sheets

US 6,936,176 B1

TRANSPORTABLE WATER TREATMENT SYSTEM

RELATED CASES

This application claims the Priority of the Provisional Application Ser. No. 60/569,887 filed May 11, 2004.

BACKGROUND OF THE INVENTION

1. Field of the Invention

The present invention provides a transportable water treatment system which is capable of providing safe drinking water.

2. Description of the Problem and Related Art

One fifth of all people on earth have no access to safe drinking water. That means more than 1.2 billion people use contaminated water to meet their everyday needs. Contaminated water takes a terrible toll. Each day 25,000 people die from cholera, typhoid, dysentery and other diseases caused by micro-organisms in the water they drink. On a yearly basis the sum is an astonishing 9 million deaths of which more than 3 million are children under the age of five. This water problem does not stand still. The World Health Organization estimates that in the next twenty five years there will be some two billion people without safe drinking water.

In developing countries waterborne diseases often present the greatest risk to human health. Water supplies may be biologically contaminated by sewage effluents that mix with floodwaters, or physically contaminated with soil and mud that enter the water supply and hinder disinfection efforts. Further, harmful chemicals (e.g., nitrates and pesticides) are also typically found in flood water under such conditions, in addition to waterborne pathogens. Yet this is not limited to only third world countries, in the developed world water supplies may be compromised by natural disaster.

Contaminated water can have two components which are referred to as a biological load and a physical load. Biological load of the water is a reference to the level of biological contaminants in the water. The physical load of the water refers to the total level of suspended solids, dissolved solids, organic carbon, and turbidity in the water.

U.S. Pat. No. 6,464,884 to Gadgil, discusses a portable water treatment system, but this unit treats the water with UV radiation which requires an additional power source and uses disposable filter cartridges which increase the overall cost of operation.

Duveau U.S. Pat. No. 4,427,551 teaches a system to physically treat contaminated water where part of the system in unpressurized. This system uses two separator means and a fine filter as part of its filtration system. In this reference it is unclear what is used for the second separator means.

Brucker U.S. Pat. No. 4,193,869 teaches a large scale waste water treatment system using a physical and chemical treatment system.

Busch Jr., U.S. Pat. No. 5,942,107 teaches a treatment system for hazardous waste water.

Nagaoka U.S. Pat. No. 6,488,842 teaches an improved filtering device to treat water.

What is needed is a water treatment system which is economical to operate, has minimal power requirements and is truly transportable, which can be carried in a small truck to remote sights.

SUMMARY OF THE INVENTION

The present invention is a cost-effective, easy to operate, easy to maintain water treatment system for placement in developing countries. On site, the system can be set up and operational in two to three hours. Typically, contaminated water is converted to safe drinking water at a rate of 10 gallons (37.9 liters) per minute, up to 10,000 gallons (37,854 liters) per day, enough to support a community of three thousand people.

A transportable water treatment system configured to purify water, comprising: an inlet adapted to receive water having a pressure of between 10 to 60 psig (pound-force per square inch gauge) or 0.70 to 4.22 kilogram-force per square centimeter gauge, a primary regenerable filter connected so as to receive water that has flown through the inlet, the primary regenerable filter configured to separate solids from water flowing therethrough, a secondary regenerable filter, the secondary regenerable filter connected downstream from the primary regenerable filter, and a chemical feed unit connected downstream of said secondary regenerable filter, the chemical feed unit configured to treat water flowing through introduction of chemicals to the water, a water discharge pipe adapted to discharge treated water from the chemical feed unit, where said inlet, the primary regenerable filter, the secondary regenerable filter, the chemical feed unit, and the discharges pipe make up a transportable water treatment and the transportable water treatment is adapted to fit within a bed of a sub-compact pickup truck.

A process for the treatment of water comprising the steps of: providing an inlet adapted to receive water, a primary regenerable filter connected so as to receive water that has flown through the inlet, the primary regenerable filter configured to separate solids from water flowing therethrough, a secondary regenerable filter, the secondary regenerable filter connected downstream from primary regenerable filter, a chemical feed unit connected downstream of said secondary regenerable filter, said chemical feed unit configured to treat water flowing through introduction of chemicals to the water, a water discharge pipe adapted to discharge treated water from the chemical feed unit, where the inlet, the primary regenerable filter, the secondary regenerable filter, the chemical feed unit, and the discharges pipe make up a transportable water treatment and the transportable water treatment is adapted to fit within a bed of a sub-compact pickup truck; providing a pumping means capable of generating water pressure of between 10 to 60 psig or 0.70 to 4.22 kilogram-force per square centimeter gauge; providing a water source; pumping water from said water source at a water pressure between 10 to 60 psig or 0.70 to 4.22 kilogram-force per square centimeter gauge; filtering water through said primary regenerable filter; filtering water through said secondary regenerable filter; treating water with a chlorine solution; and discharging the treated water.

DETAILED DESCRIPTION OF THE INVENTION

Figure 1:
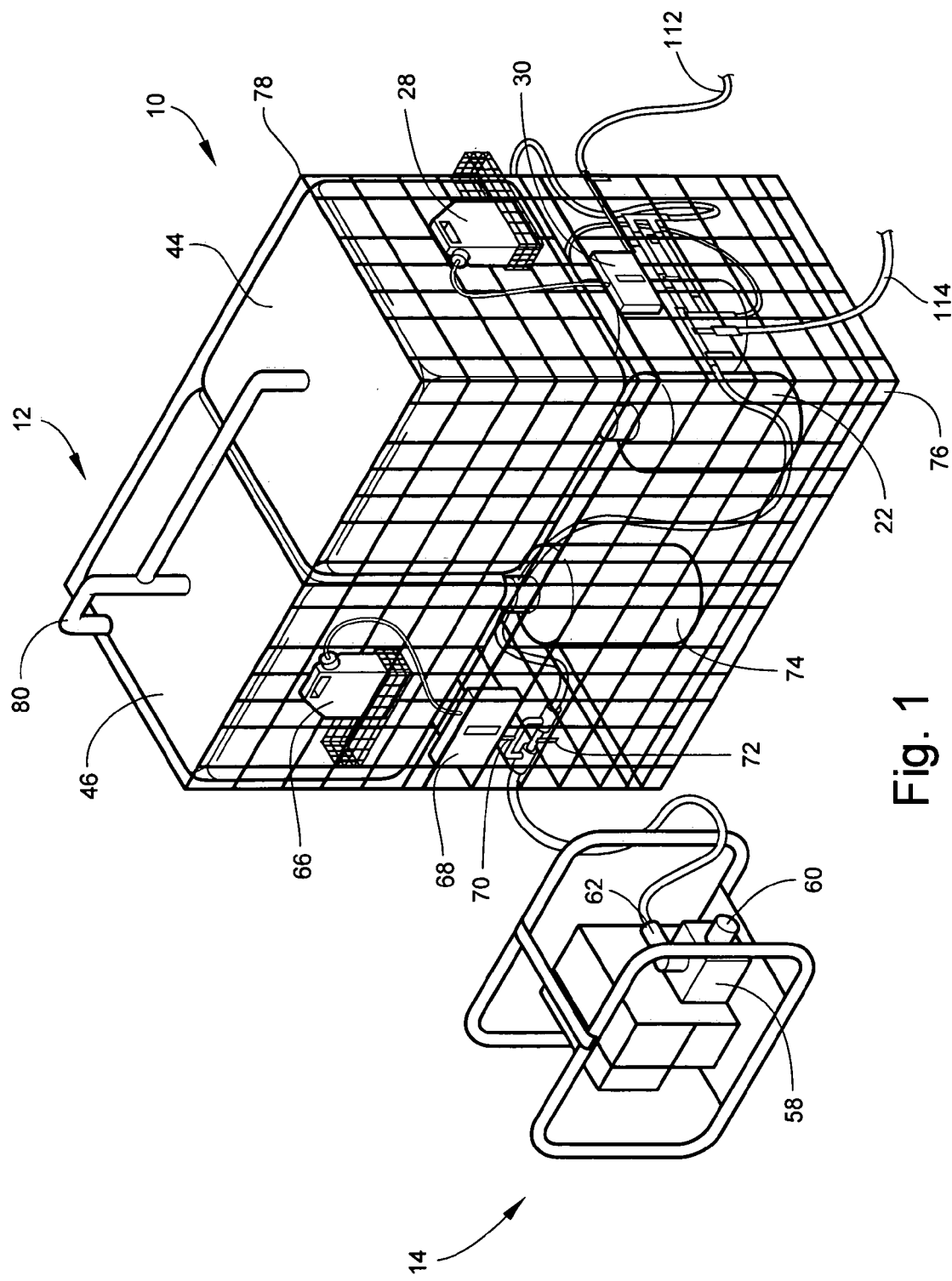
FIG. 1 is a perspective view of the components of a transportable water treatment unit in accordance with the present invention.

The transportable water treatment system of the present invention can be seen in FIG. 1, and is comprised of the water treatment unit 10. Depending on the quality of the water source the optional pretreatment unit 12 may be needed to provide clear potable Water. As the water treatment unit 10 is a pressurized system it requires a means of generating water pressure such as a pump 14.

Figure 3:
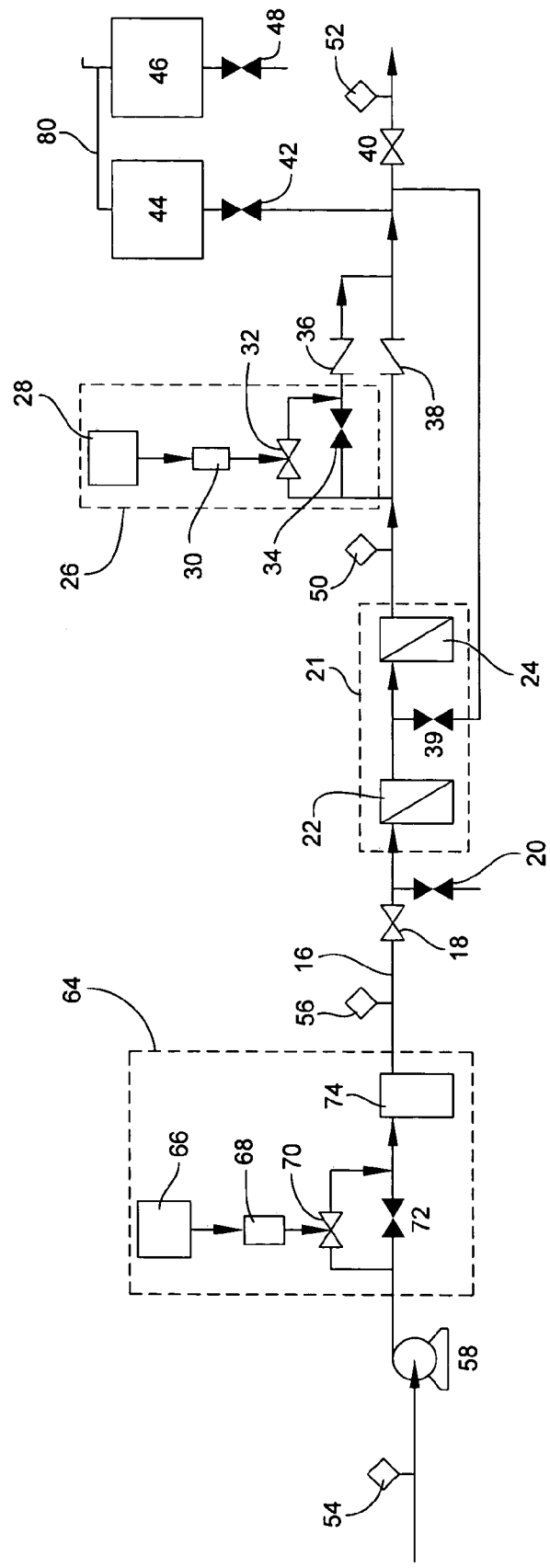
FIG. 3 is a flow chart which details the use of the system in the water purification mode.

To understand the transportable water treatment unit 10 it is best to see FIG. 3 which shows the treatment of raw untreated water. Possible water sources include streams, rivers, lakes, lagoons and wells. This transportable water treatment system is configured to purify water. It is comprised of an inlet 16 adapted to receive water having a pressure of between 10 to 60 psig or 0.70 to 4.22 kilogram-force per square centimeter gauge. Inlet 16 is in communication with inlet valve 18 and primary regenerable filter 22 connected so as to receive water that has flown through the inlet 16. The primary regenerable filter is configured to separate solids from water flowing there through. A secondary regenerable filter 24, is connected downstream from primary regenerable filter 22. Chemical feed unit 26 connected downstream of the secondary regenerable filter 24, is configured to treat water flowing through the system through introduction of chemicals to the water. A water discharge pipe 112 is connected to the potable water storage control valve 40 which is in communication with chemical feed unit 26, and in particular the chemical venturi 32 and chemical bypass valve 34 through a back flow preventative check valve 36. The inlet 16, the primary regenerable filter 22, the secondary regenerable filter 24, the chemical feed unit 26, and the discharge pipe 112 make up a transportable water treatment unit 10 and said transportable water treatment unit is adapted to fit within a bed of a sub-compact pickup truck.

Figure 2:
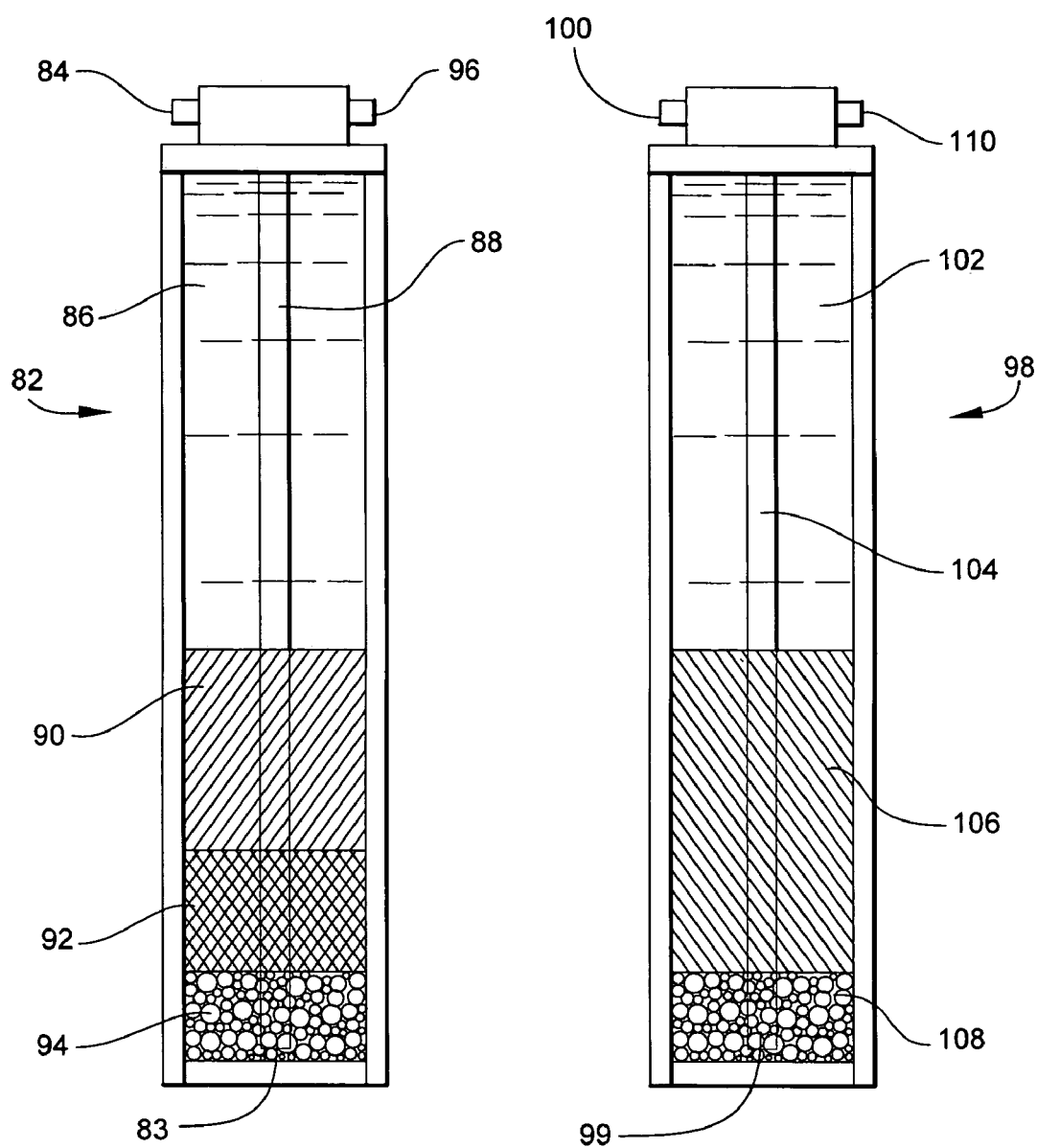
FIG. 2 is a cut away view of the regenerable filters of the present invention.

The primary regenerable filter 22 is a sealed center tube discharge tank 82, as seen in FIG. 2 having a bottom feed 83 and filter media comprising a first filter media 90 and a second filter media 92 on top of a support media 94. Water flows into the center tube discharge tank 82 through primary filter tank inlet 84 which is in communication with the primary tank 86 and where the bottom feed 83 of center discharge tube 88 is found in the support layer 94. In the primary regenerable filter tank it is important to use filter media which is capable of removing suspended impurities but that can undergo a backflush of the system and will resettle in two discreet layers. The first filter media 90 should have particles that are larger in size than the second filter media 92. However it is important that one chooses a first filter media that has a specific gravity of an order of magnitude less than the second filter media so that after the back wash that they will resettle into two discreet layers. One material which works well as the first filter media is a layer of anthracite. This anthracite can have average particle size between 0.5 and 1.5 millimeter in diameter, preferably of about 1 millimeter in diameter. Garnet works well as the second filter media, specifically garnet 30/40 which has particles that range in size from 425 to 600 micrometres. A layer of support material which acts as a base for the first and second filter media, is selected from the group consisting of coarse garnet or gravel having an average particle size of between 1.8 to 5 millimeters. The coarse garnet can be garnet #8 which has an approximate particle size of 2.4 mm. The water which has passed through the primary filter exits by the outflow from primary tank 96 and is in communication with the secondary regenerable filter tank 24. While the overall tank dimensions will determine the amount of filter media used, it has been found that for a tank having a diameter of 16 inches or about 41 cm that 6 inches (15.2 cm) of anthracite, 12 inches (30.5 cm) of garnet 30/40 and 3 inches (7.6 cm) of garnet #8 work well.

The secondary regenerable filter 24 is a sealed center tube discharge tank 98 having a bottom feed 99 and filter media comprising a third filter media 106 on top of a support media 108. This third filter media 106 should be smaller in size than second filter media 92. Water flows into the center tube discharge tank 98 through the secondary filter tank inlet 100 which is in communication with the secondary tank 102 and where the bottom feed 99 of center discharge tube 104 is found in the support layer 110. This water exits the center tube discharge tank 98 through the secondary filter tank outflow 110 which is in communication with the chemical feed unit 26. One material which works well as the third filter media is a layer of fine garnet, specifically garnet 100 which has particles that range in size equal to or between 200 to 75 micrometres preferably of approximately 150 micrometres. The support material 110 is selected from the group consisting of coarse garnet or gravel having an average particle size of between 1.8 to 5 millimeters. The coarse garnet can be garnet #8 which has an approximate particle size of 2.4 mm. In this second regenerable filter 24 one can also use a thin layer of second filter media 92 in between the third filter media 106 and the support material 110. While the overall tank dimensions will determine the amount of filter media used, it has been found that for a tank having a diameter of 16 inches or about 41 cm that 16 inches (40.6 cm) of garnet 100, 2 inches (5 cm) of garnet 30/40 and 3 inches (7.6 cm) of garnet #8 work well.

This transportable water treatment system 10 has a chemical feed unit 26 comprises a chemical solution tank 28 in communication with a chemical flow meter 30 in communication with a means for intimate mixing of water coming from said primary regenerable filter and said secondary regenerable filter with a chlorine solution prior to discharge. Chemical flow meter 30 is available from Key Instruments, Trevose Pa. Means for intimate mixing of water is a chemical venturi 32. Generally the chemical solution will be a chlorine solution which is obtainable by mixing chlorine tablets or granules with water. This solution ranges from 0.3 to 0.8% by weight of chlorine to water. The chemical solution tank 28 feeds the treatment solution into a chemical flow meter 30 where the addition of the chemical solution can be metered precisely to the chemical venture 32. This chemical feed unit can be equipped with a bypass valve 34 so selective engagement of the chemical feed unit. Further to protect the chemical feed unit 26 during backflush of the system a back flow preventative check valve 36 is fitted between the chemical feed unit bypass valve 34 and primary water storage valve 42 and potable water discharge valve 40. A forward flow preventative check 38 valve is also installed in communication with the secondary regenerable filter 24 and the primary water storage valve 42 and potable water discharge valve 40. The goal of the chemical feed system is a continuous supply of chlorine so that the potable water being discharged from the system is has a chlorine level of from 1 parts per million (here in after ppm) to 4 ppm of chlorine where the preferred target is 2 ppm.

The system of the invention is a pressurized system and further comprising a pump 58 capable of generating water pressure of between 10 to 60 psig or 0.70 to 4.22 kilogram-force per square centimeter gauge having a water intake 60 and a water discharge 62 where the water discharge 62 is in communication with the water inlet 16 of the filtration system 21. This pump is selected from the group consisting of: hand pumps, mechanical pumps, pneumatic pumps, gasoline powered pumps, diesel powered pumps, steam pumps, animal powered pumps, electric pumps, wind powered pumps, or any other type of pumping mechanism capable of generating water pressure of between 10 to 60 psig or 0.70 to 4.22 kilogram-force per square centimeter gauge.

The transportable water treatment system further comprising an elevated water tank 44 in communication with the chemical feed unit 26, adapted to dispense purified water 52, and adapted to provide clean water to regenerate the primary regenerable filter 22 and the secondary regenerable filter 24.

A protective enclosure encases the transportable water treatment system 76. Preferably this protective enclosure is made from a material which is not prone to rust or decay when it is exposed to water. The purpose of the enclosure is to protect the tanks 22 and 24 during normal operation. Further a protective enclosure 78 may also be employed to provide protection to the elevated water tank 44. This protective enclosure also protects all the parts of the present invention when they are first shipped to a site. It also facilitates in the systems ability to be moved after the initial installation. This regenerable system is adapted to fit comfortably in the bed of a sub-compact pick up truck. This type of truck is prevalent in third world countries. This size also ensures ease of transport in larger pickups or other trucks.

The protective enclosure 78 can be adapted to hold a water storage tank above said primary regenerable filter 22 and said secondary regenerable filter 24 so that the water storage tank provides a gravity feed with sufficient pressure to run a back flush of the primary regenerable filter 22 and the secondary regenerable filter 24.

The transportable water treatment system can further comprise a pretreatment unit 12 in communication with the inlet 16 comprising: an alum feed tank 66 containing alum in communication with a flow meter 68 in communication with a venturi 70, said venturi 70 being in communication with a flocculation tank 74 where the flocculation tank 74 is in communication with the primary regenerable filter 22. This flocculation tank 74 is a sealed center tube discharge tank having a bottom feed where the flocculation tank 74 provides residence time subsequent to the addition of alum. Flocculation tank 74 is very similar to the secondary regenerable filter 98 but without the third filter media 106 and the support media 108. Alum is available as either a powder or in granular form which needs to be mixed into a solution ranging from 5 to 10% by weight of alum to water. When this unit is used it results in the discharged potable water having from 15 ppm to 45 ppm of alum, with a target of about 30 ppm. The pretreatment unit 12 can have a bypass valve 72 to allow for selective engagement of the pretreatment unit 12. The pretreatment unit is also preferably fitted within a protective enclosure. This enclosure allows for the use of a second water storage tank 46 in communication with the water storage tank 44. Second water storage tank 46 is also equipped with a water discharge valve 48. As the system is pressurized it is best to equip the water storage tanks 44 and 46 with an overflow vent 80. Once these elevated tanks are filled with chlorinated water water can either be distributed from the discharge pipe 112 by opening valve 40 or directly from the water storage tanks through valves 42 and 48.

A process for the treatment of water comprising the steps of: providing an inlet 16 adapted to receive water 54, a primary regenerable filter 22 connected so as to receive water that has flown through the inlet 16, the primary regenerable filter 22 configured to separate solids from water flowing therethrough, a secondary regenerable filter 24, the secondary regenerable filter 24 connected downstream from the primary regenerable filter 22, a chemical feed unit 26 connected downstream of the secondary regenerable filter 22, the chemical feed unit configured to treat water 50 flowing through the system through introduction of chemicals to the water, a water discharge pipe 112 adapted to discharge treated water 52 from the chemical feed unit, where the inlet 16, the primary regenerable filter 22, the secondary regenerable filter 24, the chemical feed unit 26, and the discharges pipe 112 make up a transportable water treatment and the transportable water treatment is adapted to fit within a bed of a sub-compact pickup truck; providing a pumping means capable of generating water pressure of between 10 to 60 psig or 0.70 to 4.22 kilogram-force per square centimeter gauge; providing a water source; pumping water from the water source at a water pressure between 10 to 60 psig or 0.70 to 4.22 kilogram-force per square centimeter gauge; filtering water through the primary regenerable filter 22; filtering water through said secondary regenerable filter 24; treating water with a chlorine solution; and discharging the treated water.

Figure 4:
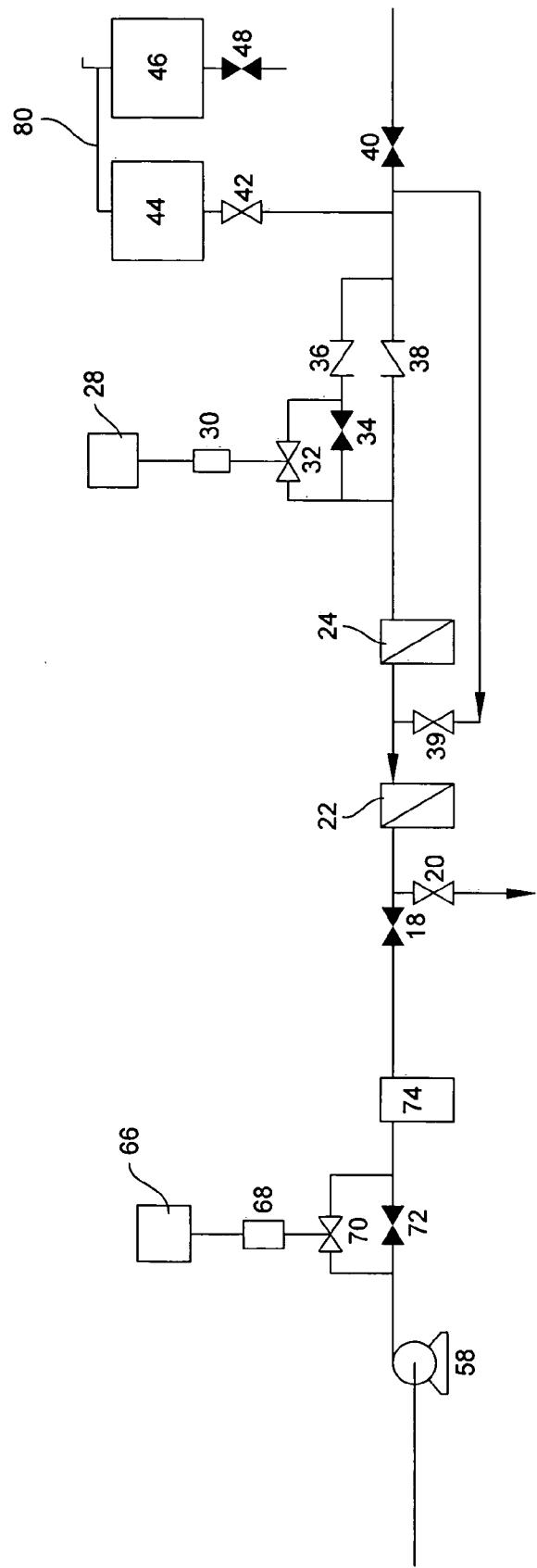
FIG. 4 is a flow chart which details the back wash of the primary filter.
Figure 5:
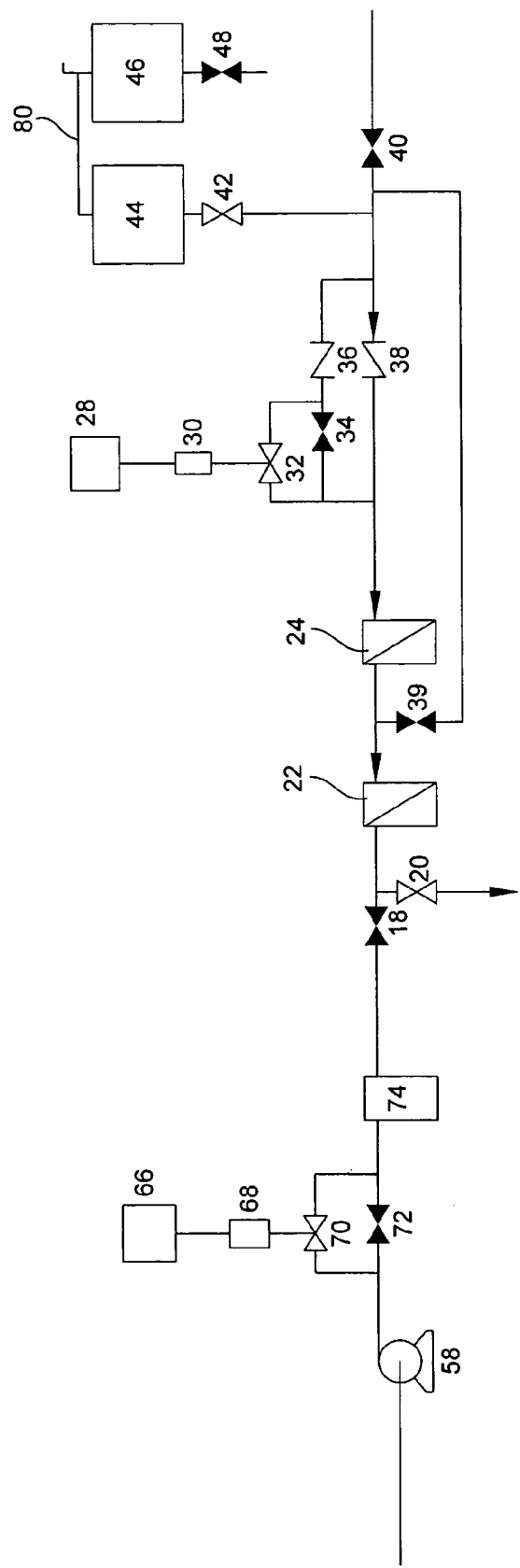
FIG. 5 is a flow chart which details the back wash of both filters.

Further, this process for the treatment of water can further comprising the steps of: providing an elevated water tank 44 in communication with said chemical feed unit 26, adapted to dispense purified water, and adapted to provide clean water to regenerate the primary regenerable filter 22 and the secondary regenerable filter 24 through a primary back flush valve 42 and secondary back flush value 39; and pumping water treated with said chloride solution to said elevated water tank 44. This allows for the regeneration of the primary regenerable filter 22 and the secondary regenerable filter 24 by opening the primary back flush value 42 and feeding by gravity feed the treated water in the elevated water tank in the reverse direction through said secondary regenerable filter 24 and through said primary regenerable filter 22 to flush out the impurities that these filters have picked up as shown in FIG. 5. The elevated water tank 44 also allows for the regeneration of the primary regenerable filter 22 by opening the secondary back flush value 39 and feeding by gravity feed the treated water in the elevated water tank in the reverse direction through said primary regenerable filter 22 to flush out the impurities that this filter has picked up as shown in FIG. 4. As the primary regenerable filter 22 is the first filter in the filtration system 21 it usually gets the dirtiest fastests and requires additional backwash to properly clean it out. During back flush of the system as shown in FIGS. 4 and 5, inlet valve 18 is closed and backwash runoff valve 20 is open. In normal operation as shown in FIG. 3 inlet valve 18 is open and backwash runoff valve 20 is closed.

When the water treatment system 10 is set up in its basic configuration and it fails to produce clear drinking water an additional process step may be necessary. The process can be modified by the addition of the steps to provide a pretreatment unit 12 in communication with the inlet 16 having an alum feed tank 66 containing alum in communication with a flow meter 68 in communication with a venturi 70, the venturi 70 being in communication with a floccullation tank 74 where the flocculation tank 74 is in communication with the primary regenerable filter 22; treating the water with alum prior to the first filtering step; transferring said treated water to said flocculation tank to allow residence time subsequent to the addition of alum; and discharging water 56 from the flocculation tank 74 to the primary regenerable filter 22.

EXAMPLES

An operable example of the present invention is capable of being set up and operational in two to three hours. Contaminated water is converted to safe drinking water at a rate of 10 gallons (37.9 liters) per minute, up to 10,000 gallons (37,854 liters) per day, calculating a running time of less than 17 hours of continuous use per day, which leaves time for back washing the system on a daily basis. The operable example is similar to the system shown in FIG. 1 where 10 shows the basic unit, 12 shows the pretreatment unit and 14 shows a motorized pump. Water storage tanks 46 and 44 are blown plastic tanks that have a capacity of about 275 gallons each (1041 liters). The sealed tanks 22, 24 and 74 each have a capacity of less than 50 gallons (189 liters) each. As shown in FIG. 2 the regenerable filter tanks 82 and 98 weigh less than 50 pounds (22.7 kg) without filter media but weigh around 300 pounds (136 kg) each after the filter medium is loaded. The primary regenerable filter 82 general has 6 inches (15 cm) of anthracite 90, 12 inches (30 cm) of garnet 30/40 92 and 3 inches (8 cm) of garnet #8 94. Secondary regenerable filter 98 has 16 inches (41 cm) of garnet 100, 106, and 3 inches (8 cm) of garnet #8 108, preferably a layer of about 2 inches (5 cm) of garnet 30/40 is put in between the layer of garnet 100 and the layer of garnet #8.

The transportable water treatment system of the present invention is designed to accept the effluent stream from a pump at a pressure between 10 to 60 psig (pound-force per square inch gauge) or 0.70 to 4.22 kilogram-force per square centimeter gauge. Preferably the income pressure is between or equal to 30 to 40 psig or 2.11 to 2.81 kilogram-force per square centimeter gauge. This water pressure is generated by pump 14 which can be a diesel pump. The pressurized transportable water treatment system is easy to maintain and has low operation costs. Cost to treat 1,000 gallons of water can be less than a dollar.

In the preferred system tank 44 and the primary and secondary regenerable filters 22 and 24 are housed within protective enclosures 78 and 76. If a pretreatment system is used it would also house its tank 74 in a protective enclosure and a secondary water storage tank 46 in a protective enclosure. Another option would be to house tank 74 in protective enclosure 76, and to provide an additional water tank like tank 44 which could be housed in the protective enclosure. These protective enclosures help protect the individual components when shipped and once set up provide a rugged design adapted for years of continuous use.

Equipment for the transportable water treatment system of the present invention including the basic unit 10 and the pretreatment system 12 but exclusive of pump 14 weigh about 1245 pounds (565 kg) as shown in FIG. 1.

In backwashing the transportable water treatment system of the present invention clean water is used from a storage tank 44 stored above the regenerable filters 22 and 24 and the system is gravity feed which helps reduce the cost of the backwash operation. Generally the back wash will be performed until the water running through the regenerable filters in the opposite direction (see FIGS. 4 and 5) from the filtering process is clear.

What is claimed is:
1. A transportable water treatment system configured to purify water, comprising:
    an inlet adapted to receive water having a pressure of between 10 to 60 psig (0.70 to 4.22 kilogram-force per square centimeter gauge);
    a primary regenerable filter connected so as to receive water that has flown through said inlet, said primary regenerable filter configured to separate solids from water flowing therethrough, said primary regenerable filter comprises a layer of anthracite having an average particle size of between 0.5 and 1.5 millimeter in diameter a layer of garnet having an average particle size between or equal to 425 to 600 micrometres and a layer of support material where support material is selected from the group consisting of coarse garnet or gravel having an average particle size of between 1.8 to 5 micrometres;
    a secondary regenerable filter, said secondary regenerable filter connected downstream from primary regenerable filter, said secondary regenerable filter further comprises filter media comprising a layer of garnet having an average particle size between or equal to 200 to 75 micrometres a layer of garnet having an average particle size between or equal to 425 to 600 micrometres and a layer of support material where support material is selected from the group consisting of coarse garnet or gravel having an average particle size of between 1.8 to 5 micrometres; and
    a chemical feed unit connected downstream of said secondary regenerable filter, said chemical feed unit configured to treat water flowing through introduction of chemicals to the water;
    a water discharge pipe adapted to discharge treated water from said chemical feed unit; and
    where said inlet, said primary regenerable filter, said secondary regenerable filter, said chemical feed unit, and said discharges pipe make up a transportable water treatment and said transportable water treatment is adapted to fit within a bed of a sub-compact pickup truck.
2. The transportable water treatment system according to claim 1 where said primary regenerable filter is a sealed center tube discharge tank having a bottom feed where the bottom feed of center discharge tube is found in the support layer.
3. The transportable water treatment system according to claim 1 where said secondary regenerable filter is a sealed center tube discharge tank having a bottom feed, where the bottom feed of center discharge tube is found in the support layer.
4. The transportable water treatment system according to claim 1 where said chemical feed unit comprises a means for intimate mixing of water coming from said primary regenerable filter and said secondary regenerable filter with a chlorine solution prior to discharge, where said means for intimate mixing of water is a venturi.
5. The transportable water treatment system according to claim 4 where said chlorine solution is a solution ranging from 0.3 to 0.8% by weight of chlorine to water.
6. The transportable water treatment system according to claim 4 where said chemical feed unit further comprises a flowmeter for the addition of said chlorine solution.

7. The transportable water treatment system according to claim 1 further comprising:
   a clean water source; and
   a system of valves which allow water to be treated to flow into said primary regenerable filter and then through said secondary regenerable filter and said clean water to run through said secondary regenerable filter and then through said primary regenerable filter or simply through said primary regenerable filter.

8. The transportable water treatment system according to claim 1 where said transportable water treatment system is self contained within a protective enclosure.

9. The transportable water treatment system according to claim 8 where said protective enclosure is adapted to hold a water storage tank above said primary regenerable filter and said secondary regenerable filter so that said water storage tank provides a gravity feed with sufficient pressure to run a back flush of said primary regenerable filter and said secondary regenerable filter.

10. The transportable water treatment system according to claim 1 further comprising a pump capable of generating water pressure of between 10 to 60 psig (0.70 to 4.22 kilogram-force per square centimeter gauge) having a water intake and a water discharge and said water discharge in communication with said inlet.

11. The transportable water treatment system according to claim 1 further comprising an elevated water tank in communication with said chemical feed unit, adapted to dispense purified water, and adapted to provide clean water to regenerate said primary regenerable filter and said secondary regenerable filter.

12. The transportable water treatment system according to claim 1 further comprising a pretreatment unit in communication with said inlet comprising:
   an alum feed tank containing alum in communication with a flow meter in communication with a venturi, said venturi being in communication with a flocculation tank where said flocculation tank is in communication with said primary regenerable filter.

13. The transportable water treatment system according to claim 12 where said flocculation tank is a sealed center tube discharge tank having a bottom feed where said flocculation tank provides resonance time for addition of alum.

14. The transportable water treatment system according to claim 1 where said pretreatment unit has a bypass valve to allow for selective engagement of said pretreatment unit.

15. A process for the treatment of water comprising the steps of:
   providing an inlet adapted to receive water, a primary regenerable filter connected so as to receive water that has flown through said inlet, said primary regenerable filter configured to separate solids from water flowing therethrough, a secondary regenerable filter, said secondary regenerable filter connected downstream from primary regenerable filter, a chemical feed unit connected downstream of said secondary regenerable filter, said chemical feed unit configured to treat water flowing through introduction of chemicals to the water, a water discharge pipe adapted to discharge treated water from said chemical feed unit, where said inlet, said primary regenerable filter, said secondary regenerable filter, said chemical feed unit, and said discharges pipe make up a transportable water treatment and said transportable water treatment is adapted to fit within a bed of a sub-compact pickup truck;
   providing a pumping means capable of generating water pressure of between 10 to 60 psig (0.70 to 4.22 kilogram-force per square centimeter gauge);
   providing a water source;
   pumping water from said source at a water pressure between 10 to 60 psig (0.70 to 4.22 kilogram-force per square centimeter gauge);
   filtering water through said primary regenerable filter, where said primary regenerable filter comprises a layer of anthracite having an average particle size of between 0.5 and 1.5 millimeter in diameter a layer of garnet having an average particle size between or equal to 425 to 600 micrometres and a layer of support material where support material is selected from the group consisting of coarse garnet or gravel having an average particle size of between 1.8 to 5 micrometres;
   filtering water through said secondary regenerable filter, where said secondary regenerable filter further comprises filter media comprising a layer of garnet having an average particle size between or equal to 200 to 75 micrometres a layer of garnet having an average particle size between or equal to 425 to 600 micrometres and a layer of support material where support material is selected from the group consisting of coarse garnet or gravel having an average particle size of between 1.8 to 5 micrometres;
   treating water with a chlorine solution; and
   discharging the treated water.

16. The process for the treatment of water according to claim 15 further comprising the steps of:
   providing an elevated water tank in communication with said chemical feed unit, adapted to dispense purified water, and adapted to provide clean water to regenerate said primary regenerable filter and said secondary regenerable filter through a primary and secondary back flush valve;
   pumping water treated with said chloride solution to said elevated water tank.

17. The process for the treatment of water according to claim 16 further comprising the steps of:
   regenerating said primary regenerable filter and said secondary regenerable filter by;
   activating said primary back flush valve;
   feeding by gravity feed the treated water in said elevated water tank in the reverse direction through said secondary regenerable filter and through said primary regenerable filter to flush out the impurities that these filters have picked up.

18. The process for the treatment of water according to claim 16 further comprising the steps of:
   regenerating said primary regenerable filter by;
   activating said secondary back flush valve;
   feeding by gravity feed the treated water in said elevated water tank in the reverse direction through said primary regenerable filter to flush out the impurities that this filter has picked up.

19. The process for the treatment of water according to claim 15 further comprising the steps of:
   providing a pretreatment unit in communication with said inlet, having an alum feed tank containing alum in communication with a flow meter in communication with a venturi, said venturi being in communication with a flocculation tank where said flocculation tank is in communication with said primary regenerable filter;

treating water with alum prior to the first filtering step;

transferring said treated water to said flocculation tank to allow residence time subsequent to addition of alum; and discharging water from said flocculation tank to said primary regenerable filter.

20. A transportable regenerable filter system comprising:

an inlet adapted to receive water having a pressure of between 10 to 60 psig (0.70 to 4.22 kilogram-force per square centimeter gauge);

a primary regenerable filter connected so as to receive water that has flown through said inlet, said primary regenerable filter configured to separate solids from water flowing therethrough, where said primary regenerable filter further comprises filter media comprising a layer of anthracite having an average particle size of between 0.5 and 1.5 millimeter in diameter a layer of garnet having an average particle size between or equal to 425 to 600 micrometres and a layer of support material where support material is selected from the group consisting of coarse garnet or gravel having an average particle size of between 1.8 to 5 micrometres;

a secondary regenerable filter, said secondary regenerable filter connected downstream from primary regenerable filter where said secondary regenerable filter further comprises filter media comprising a layer of garnet having an average particle size between or equal to 200 to 75 micrometres a layer of garnet having an average particle size between or equal to 425 to 600 micrometres and a layer of support material where support material is selected from the group consisting of coarse garnet or gravel having an average particle size of between 1.8 to 5 micrometres;

a clean water source;

a system of valves which allow water to be treated to flow into said primary regenerable filter and then through said secondary regenerable filter and said clean water to run through said secondary regenerable filter and then through said primary regenerable filter or simply through said primary regenerable filter; and where said inlet, said primary regenerable filter, said secondary regenerable filter, said clean water source, and said system of valves make up a transportable regenerable filter system and said transportable regenerable filter system is adapted to fit within a bed of a sub-compact pickup truck.

\* \* \* \* \*